(12) United States Patent
Nishikawa et al.

(10) Patent No.: US 7,127,589 B2
(45) Date of Patent: Oct. 24, 2006

(54) DATA PROCESSOR

(75) Inventors: Hiroaki Nishikawa, Tsukuba (JP);
Hiroshi Tomiyasu, Tsukuba (JP);
Ryosuke Kurebayashi, Tsukuba (JP);
Shinya Ito, Tsukuba (JP); Shouhei Nomoto, Ibaraki (JP)

(73) Assignee: Semiconductor Technology Academic Research Center, Kanagawa (JP)

( * ) Notice: Subject to any disclaimer, the term of this patent is extended or adjusted under 35 U.S.C. 154(b) by 203 days.

(21) Appl. No.: 10/952,913

(22) Filed: Sep. 30, 2004

(65) Prior Publication Data

US 2005/0076188 A1 Apr. 7, 2005

(30) Foreign Application Priority Data

Oct. 1, 2003 (JP) ............................. 2003-343324

(51) Int. Cl.
*G06F 15/82* (2006.01)
*G06F 9/38* (2006.01)
(52) U.S. Cl. ...................................................... 712/25
(58) Field of Classification Search ................... 712/25, 712/23, 18, 212, 209, 201, 206
See application file for complete search history.

(56) References Cited

U.S. PATENT DOCUMENTS

| 5,511,215 | A | * | 4/1996 | Terasaka et al. | 712/25 |
|---|---|---|---|---|---|
| 5,799,167 | A | * | 8/1998 | Lesartre | 712/218 |
| 5,930,491 | A | * | 7/1999 | Hilgendorf et al. | 712/209 |
| 5,964,866 | A | * | 10/1999 | Durham et al. | 712/200 |
| 6,526,500 | B1 | * | 2/2003 | Yumoto et al. | 712/25 |
| 6,609,189 | B1 | * | 8/2003 | Kuszmaul et al. | 712/23 |
| 6,629,271 | B1 | * | 9/2003 | Lee et al. | 714/49 |

OTHER PUBLICATIONS

Japanese Office Action dated Mar. 7, 2006 of Application No. 2003-343324.
T. Takahashi et al., "A Multi-Execution Pipeline Based on a Data-Driven Processor with Control-Driven Scheme, " IPSJ SIG Notes, Mar. 11, 2003, vol. 2003, No. 27 (ARC-152), pp. 151-156.
K. Yasumura et al., "An Instruction Set Architecture of a Data-Driven Processor for Multimedia Networking Applications," IPSJ SIG Notes, Mar. 11, 2003, vol. 2003, No. 27 (ARC-152), pp. 157-162.

\* cited by examiner

*Primary Examiner*—Eric Coleman
(74) *Attorney, Agent, or Firm*—Staas & Halsey LLP (57) ABSTRACT

A data processor capable of executing sequential processing efficiently while retaining the advantages of a prior art data-driven processor. The data processor includes: an instruction fetch unit which fetches a data-driven instruction or a control-driven instruction from an instruction memory based on an input packet or a program counter; an instruction decode unit which decodes the issued instruction and, in the case of the control-driven instruction, thereafter accesses a register and performs register renaming if a data hazard is detected; a firing control unit which stores the decoded instruction in a matching memory to wait therein, and which selects one of the ready-to-fire instructions and fires the selected instruction; an execution unit which performs an operation specified by the fired instruction and, in the case of the data-driven instruction, transfers an operation result to the instruction fetch unit, or in the case of the control-driven instruction, forwards the operation result to the firing control unit; and a write back unit which writes the operation result to a register.

8 Claims, 9 Drawing Sheets

Fig.10

DATA PROCESSOR

BACKGROUND OF THE INVENTION

1. Field of the Invention

The present invention relates to a data processor for multiprocessing a data-driven program and a control-driven program, in the same pipeline, on an instruction-by-instruction basis.

2. Description of the Related Art

In a data-driven processor, instructions are issued and executed according to their data dependencies. That is, any given instruction is issued when the result of an operation is passed from an instruction that generates its source operand. Then, when all source operands necessary for an operation become available, the instruction is fired, and the operation is performed. Further, based on the dynamic data-driven principle, multiprocessing free from the overhead associated with context switching is made possible on an instruction-by-instruction basis by assigning a unique identifier (color) for each program being executed. In this specification, each individual program in execution, identified by a color, is called a process. Further, in this specification, the data-driven processor refers to a processor that employs an architecture based on the dynamic data-driven principle.

Figure 1:
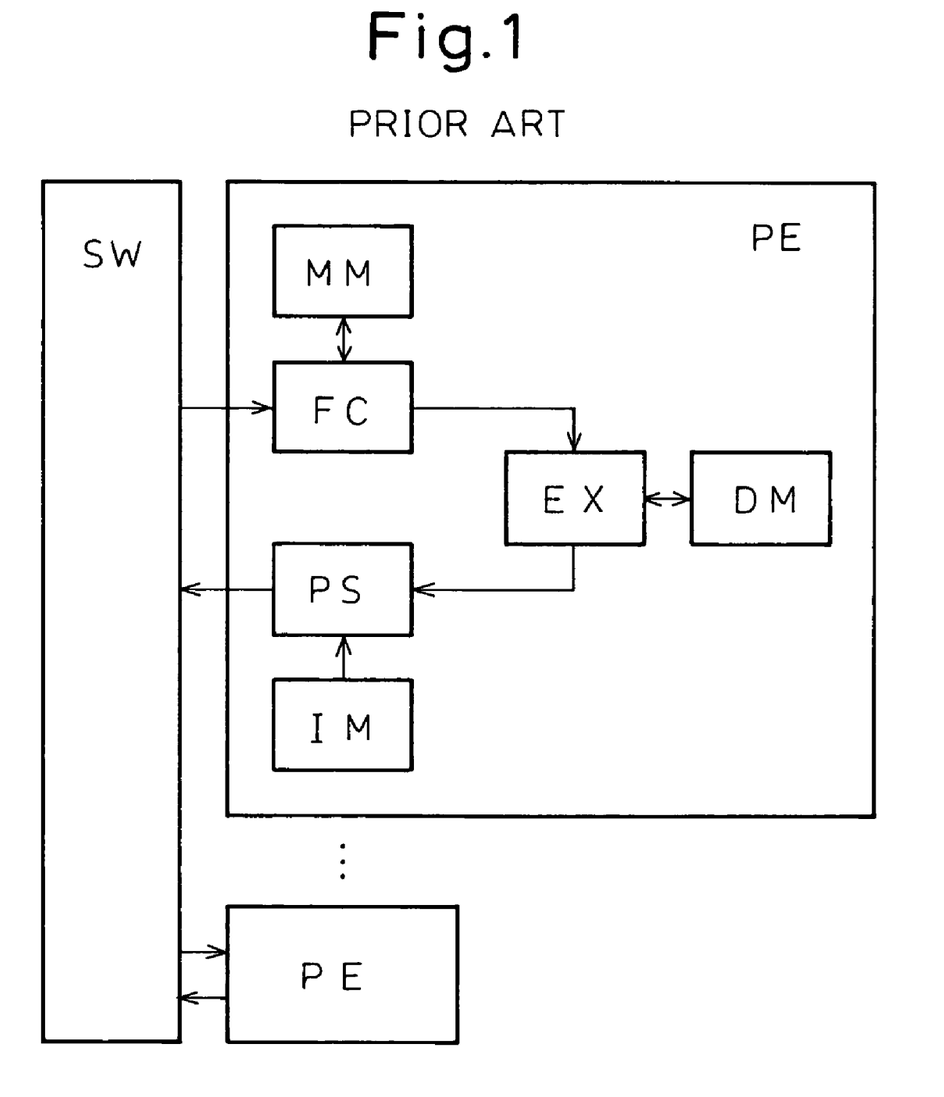
FIG. 1 is a diagram showing the basic configuration of a data-driven processor.

As shown in FIG. 1, the data-driven processor comprises a plurality of processing elements (PEs) and a packet transfer switch (SW) interconnecting the PEs. Each PE in the data-driven processor comprises three functional blocks, i.e., a firing control unit (FC), an execution unit (EX), and a program storage unit (PS). Each functional block can be divided up into a plurality of pipeline stages. A matching memory (MM) is connected to the firing control unit (FC), while an instruction memory (IM) is connected to the program storage unit (PS). Further, a data memory (DM) is connected to the execution unit (EX). With each instruction, as a packet, cycling through the pipeline, a program is executed. Therefore, the pipeline shown in FIG. 1 is called a cyclic pipeline.

First, a packet is input into a PE via the packet transfer switch (SW). Here, the packet carries the color, operation code, operand, and the instruction number that uniquely identifies the instruction within the program. The firing control unit (FC) refers to the matching memory (MM) by using the instruction number and the color of the input packet as keys, and detects whether the firing condition is satisfied or not, that is, whether all operands necessary for the execution of the instruction are available or not. If the firing condition is not satisfied, the operand carried in the packet is stored in the matching memory (MM). On the other hand, when the firing condition is satisfied, a packet carrying the operand pair is generated and transferred to the execution unit (EX).

The execution unit (EX) executes the instruction based on the operation code. Next, using the current instruction number as the address, the program storage unit (PS) fetches from the instruction memory (IM) the instruction number and operation code of the instruction that consumes the result of the operation. The packet output from the program storage unit (PS) is transferred via the packet transfer switch (SW) to the PE where the fetched instruction is to be executed.

The data-driven processor has advantages such as being able to automatically extract various granularities of parallelism residing in problems and to perform multiprocessing without requiring overhead.

In the data-driven processor shown in FIG. 1, any given instruction will not be issued until after the execution of an instruction that generates its source operand is completed. As a result, instructions having data dependencies on each other cannot be processed by pipelining. Accordingly, a delay equal to one cycle of the cyclic pipeline occurs before one instruction having a data dependency on the other is executed. When the number of pipeline stages is denoted by N, and the degree of parallelism of the program by c, then the CPI (Cycles per Instruction) is max (1, N/c). Therefore, when the degree of parallelism of the problem is smaller than the number of pipeline stages, the efficiency of pipelining decreases.

In this way, in the prior art data-driven processor, as any given instruction will not be issued until after the execution of an instruction that generates its source operand is completed, a delay of an amount equal to the number of pipeline stages occurs before one instruction having data a dependency on the other is executed and, as a result, a sequential processing part in the program becomes a bottleneck.

In the prior art, attempts have been made to improve the performance of sequential processing by introducing control-driven processing into data-driven processing. In a strongly connected arc model, when all inputs to a subprogram called a strongly connected block become available, the strongly connected block is executed by monopolizing the pipeline. As the execution of instructions outside the strongly connected block is excluded, advanced control of instructions is facilitated. Furthermore, as tokens in the strongly connected block can be stored using registers, overhead associated with matching and the copying of operation results can be reduced. This, on the other hand, impairs the advantages that the prior art data-driven processor has, that is, the latency hidden by multiprocessing on an instruction-by-instruction basis and the retention of the response of each individual process.

SUMMARY OF THE INVENTION

The present invention has been devised in view of the above problem, and an object of the invention is to provide a data processor that can execute sequential processing efficiently while retaining the advantages of the prior art data-driven processor.

To achieve the above object, according to a first aspect of the present invention, there is provided a data processor for multiprocessing a data-driven program and a control-driven program, in the same pipeline, on an instruction-by-instruction basis, wherein a processing element for performing pipeline processing comprises: an instruction fetch unit which fetches a data-driven instruction or a control-driven instruction from an instruction memory based on an input packet or a program counter, and issues the instruction in the form of a packet; an instruction decode unit which decodes the instruction issued from the instruction fetch unit, and outputs the decoded instruction in the form of a packet, wherein in the case of the control-driven instruction, an access is made to a register and, if a data hazard is detected, register renaming is performed, before outputting the decoded instruction; a firing control unit which stores the instruction decoded by the instruction decode unit in a matching memory for waiting therein, and which selects one ready-to-fire instruction and outputs the selected instruction in the form of a packet, thereby performing control to fire the instruction; an execution unit which performs an operation specified by the instruction fired by the firing control unit and, in the case of the data-driven instruction, transfers an operation result in the form of a packet to the instruction fetch unit, but in the case of the control-driven instruction, forwards the operation result in the form of a packet to the firing control unit; and a write back unit which writes the operation result of the control-driven instruction executed by the execution unit into a register associated therewith.

Preferably, according to a second aspect of the present invention, the data processor of the first aspect includes a plurality of processing elements, wherein the packet output by the execution unit is transferred via a first packet transfer switch to the instruction fetch unit in one of the processing elements.

Preferably, according to a third aspect of the present invention, the data processor of the first aspect includes a plurality of firing control units and a plurality of execution units each paired with a corresponding one of the firing control units, wherein the packet output by the instruction decode unit is transferred via a second packet transfer switch to the firing control unit corresponding to the execution unit suited to execute the instruction.

Preferably, according to a fourth aspect of the present invention, the data processor of the first aspect is configured so that, when the data-driven instruction and the control-driven instruction can be fetched simultaneously, the instruction fetch unit preferentially fetches the data-driven instruction.

Preferably, according to a fifth aspect of the present invention, the data processor of the fourth aspect is configured so that, when the number of data-driven instructions fetched in succession exceeds a preset value, the instruction fetch unit preferentially fetches the control-driven instruction.

Preferably, according to a sixth aspect of the present invention, the data processor of the first aspect is configured so that, for the instruction input thereto, the instruction decode unit performs processing to secure an area within the matching memory to store the instruction.

Preferably, according to a seventh aspect of the present invention, the data processor of the first aspect is configured so that, in the case of the control-driven instruction, the instruction decode unit makes a write reservation to a destination register.

Preferably, according to an eighth aspect of the present invention, the data processor of the first aspect is configured so that the firing control unit detects a ready-to-fire state based on color and instruction number carried in the packet input thereto while, in the case of the control-driven instruction, the firing control unit detects a ready-to-fire state by detecting arrival of a source operand value based on renamed register name carried in the packet forwarded from the execution unit.

In the data processor according to the present invention, a data-driven program, in which instructions are issued according to their data dependencies, and a control-driven program, in which instructions are issued in sequence based on a program counter, are multiprocessed in the same pipeline on an instruction-by-instruction basis. The present invention can retain the effectiveness of parallel processing provided by the data-driven program, enhance the efficiency of sequential processing by introducing the control-driven program, and achieve fair sharing of the pipeline for multiprocessing the data-driven program and the control-driven program.

BRIEF DESCRIPTION OF THE DRAWINGS

Further features and advantages of the present invention will be apparent from the following description with reference to the accompanying drawings, in which.

DESCRIPTION OF THE PREFERRED EMBODIMENTS

Figure 2:
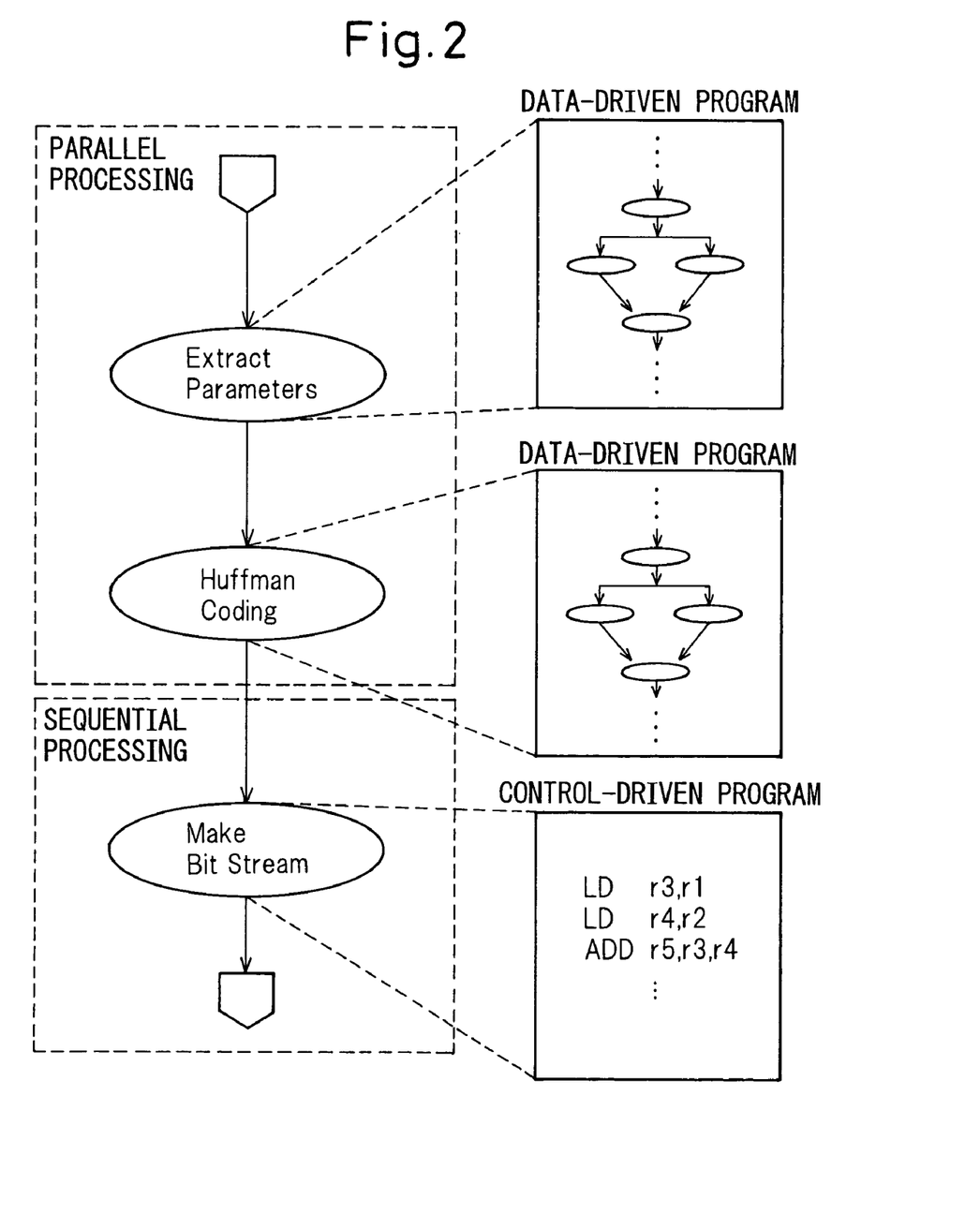
FIG. 2 is a diagram showing a data-driven program and a control-driven program by way of example.

A data processor according to the present invention multiprocesses a data-driven program and a control-driven program, in the same pipeline, on an instruction-by-instruction basis. For this purpose, as shown in FIG. 2, a program is created in such a manner that a part where processing targets can be processed in parallel is implemented using a data-driven program as has traditionally been done, while a sequential processing part where parallel processing is difficult is implemented using a control-driven program in which instructions are arranged in sequence. Instructions in the data-driven program (data-driven instructions) are issued according to their data dependencies, as in the data-driven processor shown in FIG. 1. On the other hand, instructions in the control-driven program (control-driven instructions) are issued in sequence based on a program counter (PC). In the data processor of the present invention, instructions in the data-driven program and instructions in the control-driven program, which are issued based on different driving principles, are executed by sharing the same pipeline and without interfering with each other.

The present invention allows the use of the locality of computation by implementing the sequential processing portion in the form of the control-driven program. First, instructions having data dependencies on each other can be issued in succession by issuing the instructions based on the PC. By combining this with the operation result forwarding technique, instructions having data dependencies on each other can be processed by pipelining. Compared with the advanced control of instructions, the instruction issue throughput improves, increasing the number of instructions that can be processed by pipelining despite their data dependencies. Next, as the invention allows the use of registers, an overhead associated with the copying of operation results and data flow control at the time of branching, inherent in a data-driven program, can be reduced.

In this way, by introducing the control-driven program, the efficiency of sequential processing greatly improves compared with the prior art data-driven processor. The data processor of the present invention has commonality with the strongly connected arc model in that the parallel processing part and the sequential processing part are executed based on different driving principles. However, in the prior art method, this has been accomplished primarily by using different pipelines; on the other hand, the present invention, which multiprocesses the data-driven program and the control-driven program on an instruction-by-instruction basis, offers such advantages as being able to share the same resources on the chip, schedule each process on a fair basis, and to activate a process instantly in response to any request. In this specification, the data-driven program in execution is hereinafter referred to as the data-driven process, and the control-driven program in execution as the control-driven process.

Further, in the present invention, resource allocation between the data-driven process and the control-driven process becomes important. The data-driven process monopolizes pipeline stages just equal in number to the degree of parallelism of the processing. On the other hand, the control-driven process monopolizes the pipeline irrespective of the degree of parallelism of the processing. Therefore, if the degree of parallelism of the data-driven process is smaller than the pipeline length, free resources that become available during the execution of the data-driven process are allocated to the control-driven process. On the other hand, if the degree of parallelism of the data-driven process is larger than the pipeline length, a certain proportion of the resources is allocated to the control-driven process in order to prevent the control-driven process from being put into a starvation condition. In the present embodiment, this proportion is fixed to 1/(pipeline length+1).

In the data processor of the present invention, as the data-driven program and the control-driven program are multiprocessed on an instruction-by-instruction basis, it is difficult to resolve data hazards of the control-driven program by static code scheduling. Further, considering the fact that a plurality of instructions are issued simultaneously during the execution of the control-driven program, the present embodiment employs an architecture extended so that the firing control unit in the data-driven processor can also be used as a reservation station which is widely used in a superscalar processor.

Figure 3:
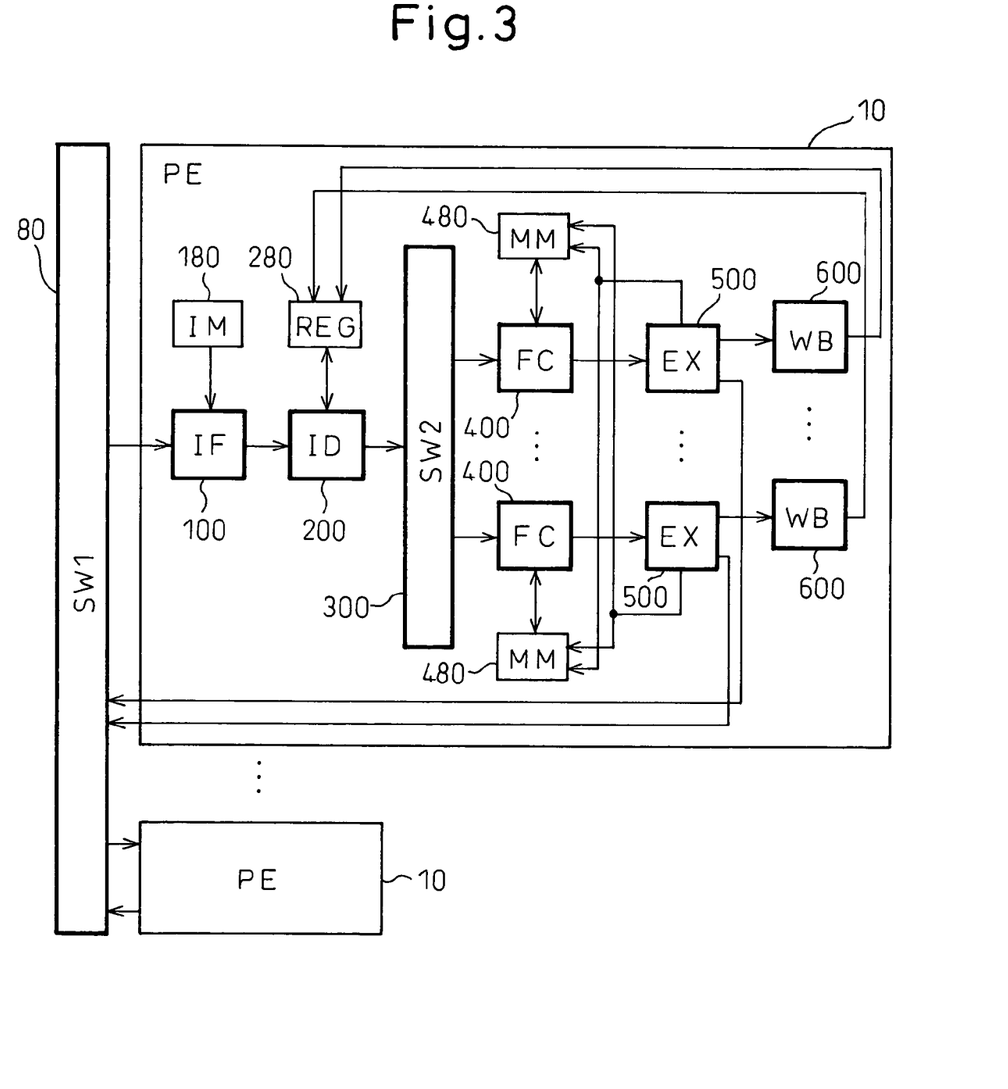
FIG. 3 is a block diagram showing one embodiment of a data processor according to the present invention.

FIG. 3 is a block diagram of one embodiment of a data processor according to the present invention, and shows the basic configuration of a pipeline according to the architecture of the present invention. As shown, the data processor of the present embodiment comprises a plurality of processing elements (PEs) 10 and a first packet transfer switch (SW1) 80 interconnecting them.

Each PE 10 comprises six functional blocks, i.e., an instruction fetch unit (IF) 100, an instruction decode unit (ID) 200, a second packet transfer switch (SW2) 300, a firing control unit (FC) 400, an execution unit (EX) 500, and a write back unit (WB) 600. In the present embodiment, the firing control unit (FC) 400 is actually a set of firing control units and, likewise, the execution unit (EX) 500 is actually a set of execution units each paired with a corresponding one of the firing control units, the configuration being such that a packet output from the instruction decode unit (ID) 200 is transferred via the second packet transfer switch (SW2) 300 to the firing control unit (FC) 400 corresponding to the execution unit (EX) 500 suited to carry out the instruction (operation) contained in the packet.

An instruction memory (IM) 180 is connected to the instruction fetch unit (IF) 100, and a register array (REG) 280 is connected to the instruction decode unit (ID) 200, while a matching memory (MM) 480 is connected to each firing control unit (FC) 400. Each execution unit (EX) 500 may be provided with a data memory (not shown).

As will be described later, when a data hazard is detected by the instruction decode unit (ID) 200 during the execution of the control-driven program, register renaming is performed, and the instruction waits in the firing control unit (FC) 400 (more specifically, in the MM 480 connected to the FC) until the operation result of an instruction that generates a source operand is forwarded from the execution unit (EX) 500.

Compared with the data-driven processor shown in FIG. 1, the major hardware elements added to the present embodiment are the register array (REG) 280 and a path for forwarding instruction results from the execution unit (EX) 500 to the firing control unit (FC) 400 (that is, the MM 480). Many other hardware elements are shared between the data-driven process and the control-driven process. In this specification, packets belonging to the data-driven process will be referred to as the data-driven packets, and packets belonging to the control-driven process as the control-driven packets. In the present embodiment, the control-driven process can be executed one at a time in each PE. For transfer of data between control-driven processes being executed in different PEs, a data-driven packet generate instruction is created as an instruction in the control-driven program and the data is transferred as a data-driven packet. Alternatively, the data transfer is performed by sharing the same memory between the different PEs. The configuration and basic operation of each functional block will be described below.

Figure 4A:
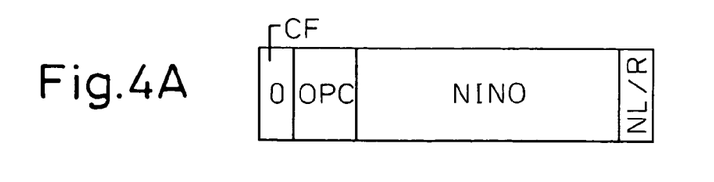
FIG. 4A is a diagram showing the basic format of a data-driven program.
Figure 4B:
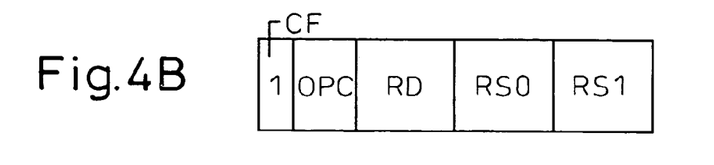
FIG. 4B is a diagram showing the basic format of a control-driven program.

First, the general configuration and basic operation of the instruction fetch unit (IF) 100 will be described. The IF fetches an instruction from the instruction memory (IM) 180 and dispatches the instruction to the instruction decode unit (ID) 200. FIGS. 4A and 4B each show the basic format of an instruction. As shown in FIG. 4A, an instruction in the data-driven program basically comprises control-driven flag CF (=0) which indicates whether the program is the control-driven program or not, operation code OPC of the instruction, next instruction number NINO which points to an instruction having a data dependency relationship with the current instruction, and next port flag NL/R which indicates whether the operation result of the current instruction provides a left operand (first operand) or a right operand (second operand) for the next instruction. On the other hand, as shown in FIG. 4B, an instruction in the control-driven program basically comprises control-driven flag CF (=1), operation code OPC, destination register RD, first source register RS0, and second source register RS1.

Figure 5:
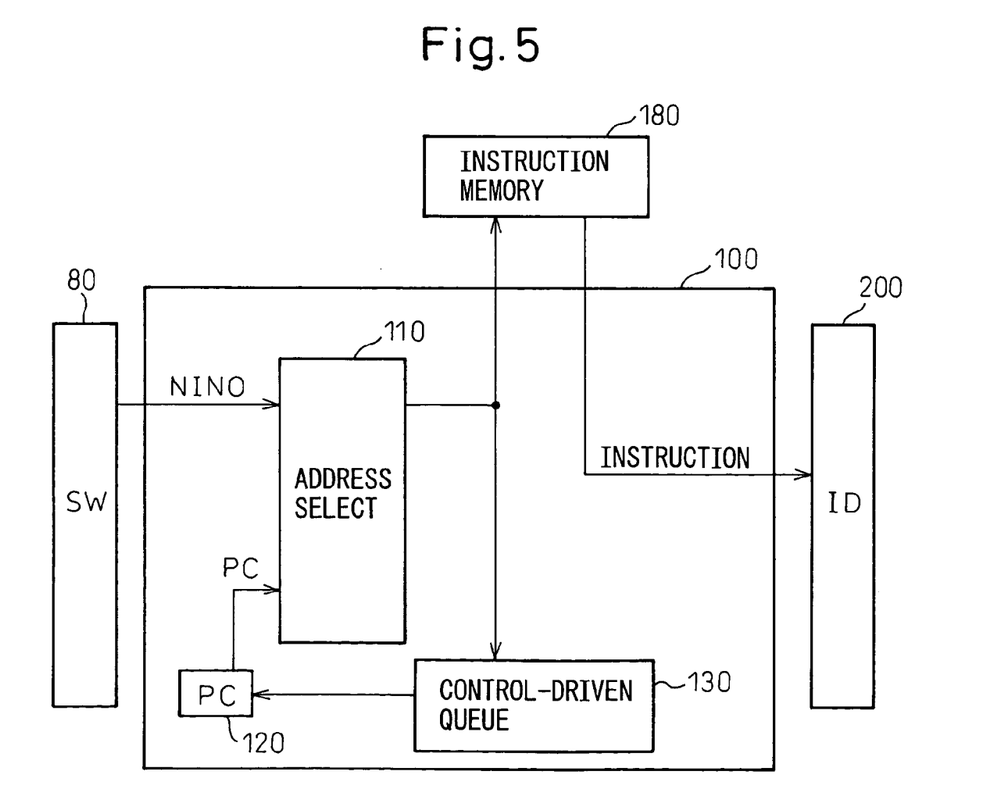
FIG. 5 is a block diagram showing the configuration of an instruction fetch unit (IF) 100.
Figure 6:
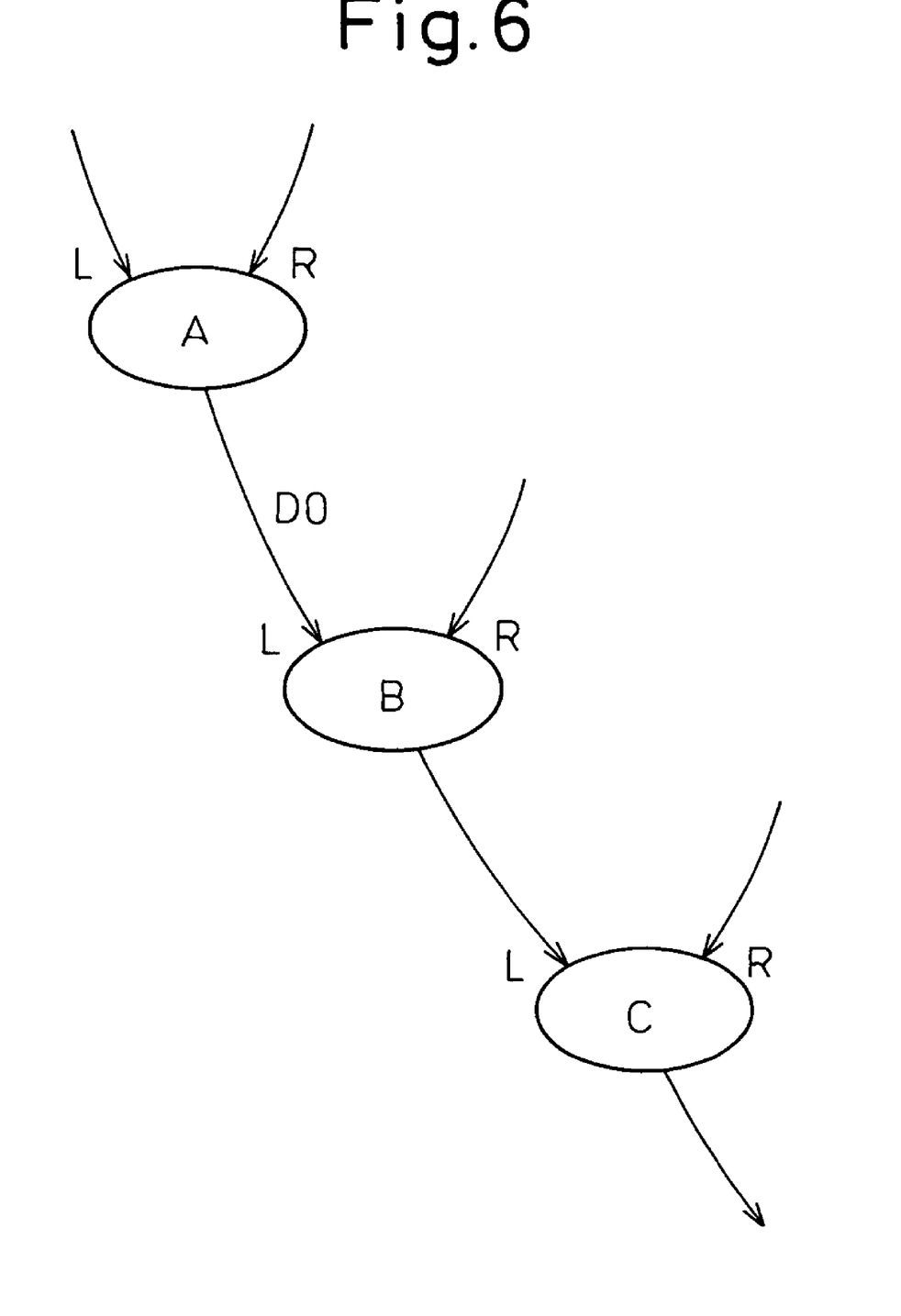
FIG. 6 is a diagram showing a dataflow graph by way of example.

The general configuration of the instruction fetch unit (IF) 100 is shown in FIG. 5. First, the basic operation will be described for the case of a data-driven instruction. Suppose, for example, that an instruction relating to a node A in the dataflow graph shown in FIG. 6 is executed in a certain execution unit (EX) 500 and its operation result D0 is stored in a data-driven packet and transferred to the first packet transfer switch (SW1) 80.

Figure 7A:
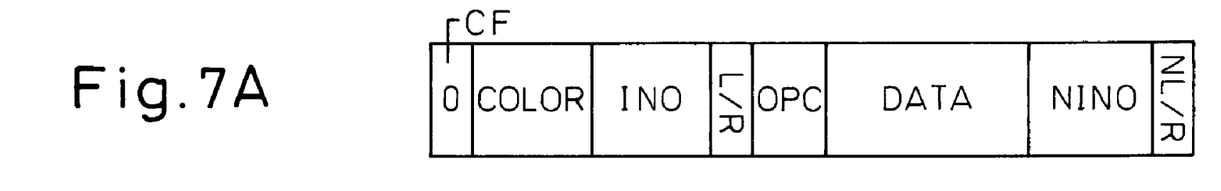
FIGS. 7A, 7B, 7C, and 7D are diagrams showing data-driven packets which the instruction fetch unit (IF), instruction decode unit (ID), firing control unit (FC), and execution unit (EX), respectively, output.
Figure 7B:
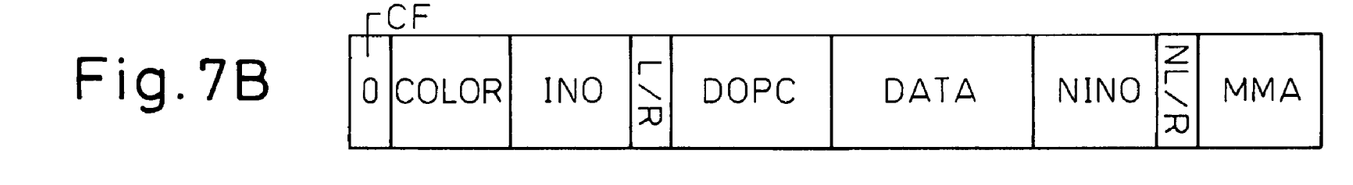
Figure 7C:
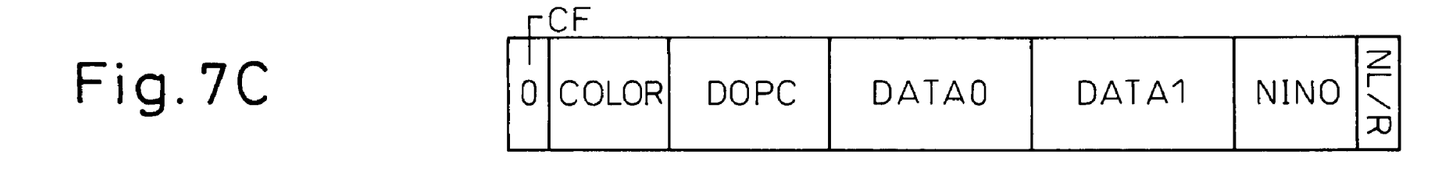
Figure 7D:
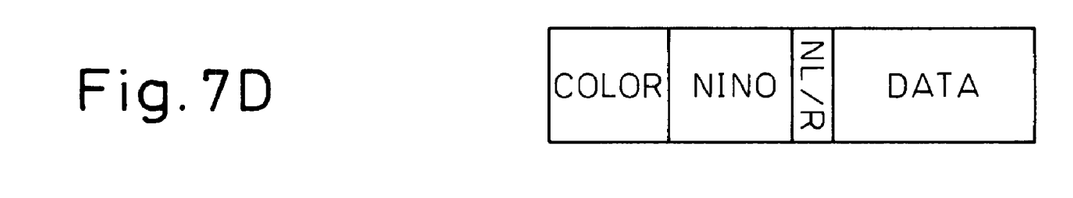

In this case, the data-driven packet that the execution unit (EX) 500 outputs carries color COLOR, next instruction number NINO, next port flag NL/R, and operation result DATA, as shown in FIG. 7D. The packet, whose DATA field contains the operation result D0 from the node A in FIG. 6, carries in its NINO field the instruction number corresponding to the node B to which the operation result D0 is to be input and, in its NL/R field, the value corresponding to the port L to which the operation result D0 is to be input. In the present embodiment, the instruction number is made up of a PE number and a node number, so that the first packet transfer switch (SW1) 80 transfers the packet to the corresponding PE 10 based on the PE number carried in the packet output from the execution unit (EX) 500.

The instruction fetch unit (IF) 100 in the PE 10 that received the data-driven packet from the execution unit (EX) 500 refers to the instruction memory (IM) 180 via an address select circuit 110 by using the next instruction number NINO in the packet (more specifically, the node number contained in the next instruction number NINO) as the address, fetches a data-driven instruction of the format shown in FIG. 4A, and creates a data-driven packet for transfer to the instruction decode unit (ID) 200 at the next stage.

The data-driven packet that the instruction fetch unit (IF) 100 outputs carries control-driven flag CF (=0), color COLOR, instruction number INO, port flag L/R, operation code OPC, operand value DATA, next instruction number NINO, and next port flag NL/R, as shown in FIG. 7A. For example, in the data-driven packet that the instruction fetch unit (IF) 100 outputs for the data DO in FIG. 6, the INO, L/R, and OPC fields contain values relating to the node B, while the NINO and NL/R fields contain values relating to the node C. That is, the contents of the NINO and NL/R fields in the packet input to the IF are carried in the INO and L/R fields, respectively, in the packet output from the IF.

Figure 8A:
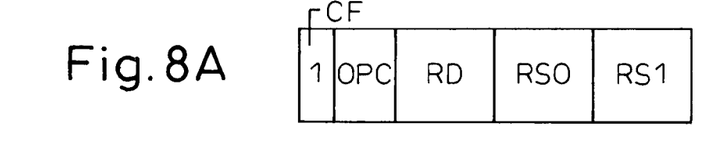
FIGS. 8A, 8B, and 8C are diagrams showing control-driven packets which the instruction fetch unit (IF), instruction decode unit (ID), and firing control unit (FC), respectively, output.

On the other hand, in the case of a control-driven instruction, the instruction fetch unit (IF) 100 refers to the instruction memory (IM) 180 via the address select circuit 110 by using the value of a program counter (PC) 120 as the address, fetches a control-driven instruction of the format shown in FIG. 4B, and creates a control-driven packet for transfer to the instruction decode unit (ID) 200 at the next stage. The control-driven packet that the instruction fetch unit (IF) 100 outputs carries control-driven flag CF (=1), operation code OPC, destination register RD, first source register RS0, and second source register RS1, as shown in FIG. 8A.

When a data-driven instruction and a control-driven instruction can be fetched at the same time, the instruction fetch unit (IF) 100 fetches either one of the instructions by selecting it via the address select circuit 110; here, in principle, the data-driven instruction is preferentially fetched in order to keep the advantage of the data-driven program that has excellent parallel processing performance. However, to guarantee the minimum frequency of issuing of control-driven instructions, the control-driven instruction is preferentially fetched if the number of data-driven instructions fetched in succession exceeds a preset value.

That is, to achieve resource sharing between the data-driven process and the control-driven process, the instruction fetch unit (IF) 100 is equipped with a counter (not shown) which counts the number of data-driven instructions issued in succession. This counter is incremented each time a data-driven instruction is issued, and is reset when a control-driven instruction is issued. When the counter value is smaller than the pipeline length, the IF preferentially issues a data-driven instruction. That is, when there is an incoming packet arriving at the IF, the IF issues a data-driven instruction to the ID. If there is no arriving packet at the IF, and if there is a control-driven process being executed, then a control-driven instruction is issued based on the PC. In this way, free resources that become available during the execution of the data-driven process are automatically allocated to the control-driven process. On the other hand, when the counter value exceeds the pipeline length, this means that the degree of parallelism of the data-driven process is larger than the pipeline length. Therefore, in this case, a control-driven instruction is preferentially issued. This ensures that the control-driven instruction is issued at least once for every "pipeline length+1" cycle.

The control-driven process is activated by issuing a special activation packet from the data-driven process. At this time, the activation packet carries the starting instruction address (the next instruction number NINO) of the control-driven program to be executed and a single word as an argument to be passed to the control-driven program. If there are two or more words as data to be passed from the data-driven process to the control-driven process, as the two processes share the same memory, an address is given as an argument in the activation packet and the data is transferred via the memory.

When the activation packet for the control-driven process arrives at the IF, the IF operates, as described below, according to whether or not there is any other control-driven process being executed. That is, if there is no other control-driven process being executed, the execution of the control-driven program indicated by the arriving activation instruction is initiated. More specifically, a control-driven instruction is fetched in accordance with the next instruction number NINO in the activation packet, and the resulting control-driven packet is dispatched to the ID. At the same time, the program counter (PC) is updated to indicate the address of the next instruction to be issued. On the other hand, if there is already another control-driven process being executed, the newly activated control-driven process is put in an execution wait state. That is, the activation packet is stored in a special hardware FIFO (control-driven process queue) 130. Upon completion of the execution of the control-driven process currently being executed, one activation instruction is taken from the control-driven process queue, and the execution of the new control-driven process is initiated.

On the other hand, a data-driven packet generate instruction is included in the control-driven program to pass data from the control-driven process to the data-driven process. The generated data-driven packet carries the instruction address (the next instruction number NINO) of the data-driven program to be executed and a single word as an argument to be passed to the data-driven program. In the control-driven program, the data-driven packet generate instruction can be used at a desired point and a desired number of times.

Next, the general configuration and basic operation of the instruction decode unit (ID) 200 will be described. The ID decodes the operation code OPC contained in the input packet, and secures an area within the matching memory (MM) 480 to store the instruction. Here, areas within the matching memory are managed by providing for each entry in the matching memory a flag (BUSY flag) that indicates whether the entry is in use or not. That is, the ID detects an entry whose BUSY flag is not valid, and sets that BUSY flag. The address of the area secured within the matching memory is designated MMA (Matching Memory Address). The BUSY flag thus set is reset when the execution of the instruction for which the corresponding entry has been secured is completed.

When the data-driven packet shown in FIG. 7A is input, the instruction decode unit (ID) 200 outputs the data-driven packet shown in FIG. 7B. That is, the output packet carries control-driven flag CF (=0), color COLOR, instruction number INO, port flag L/R, decoded operation code DOPC, operand value DATA, next instruction number NINO, next port flag NL/R, and MMA of the current instruction.

Figure 9:
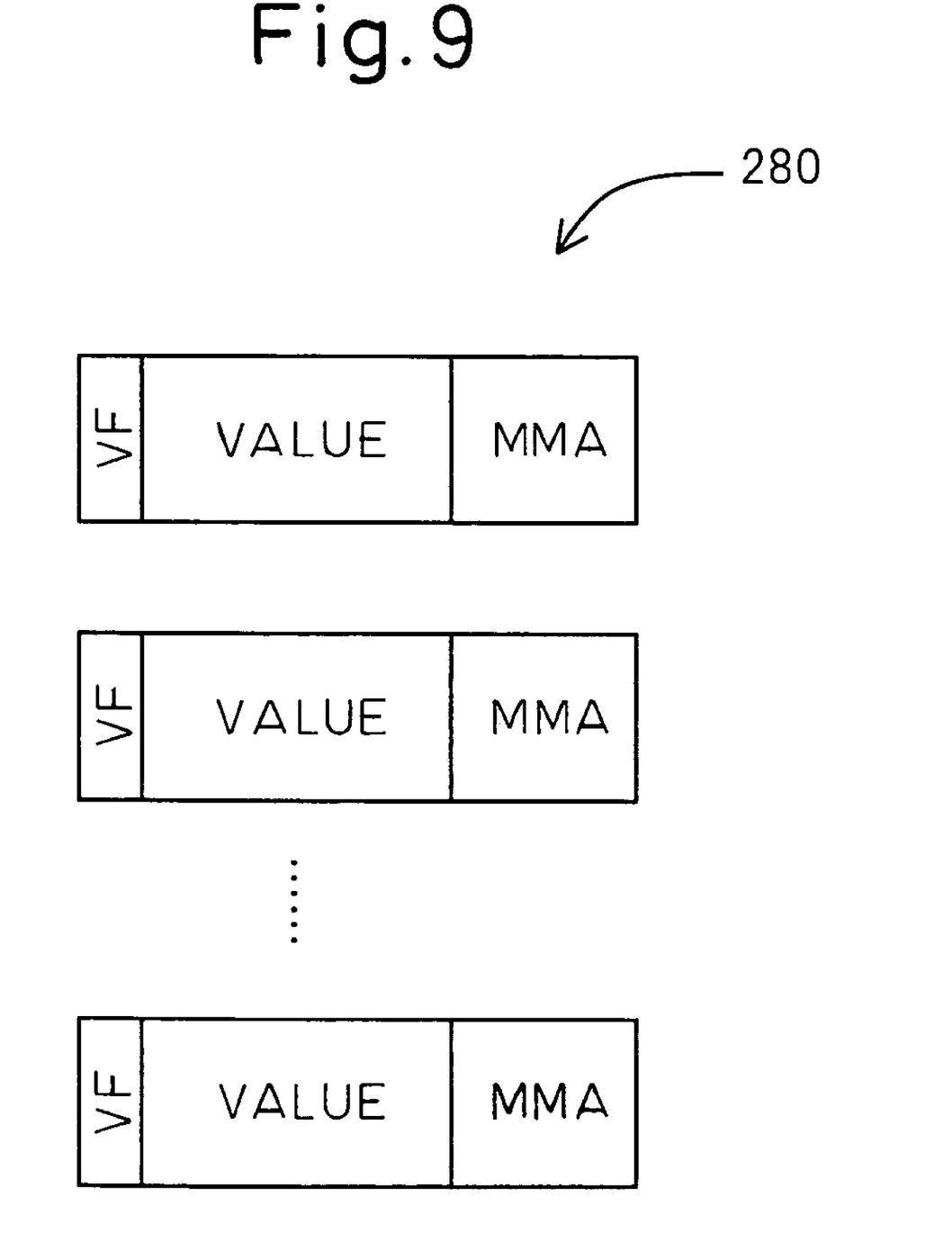
FIG. 9 is a diagram showing the configuration of a register array (REG) 280.

On the other hand, when the input packet is the control-driven packet shown in FIG. 8A, the instruction decode unit (ID) 200 further accesses the register array (REG) 280. To resolve data hazards of the control-driven program, each register is provided with a mechanism for register renaming, similar to the one employed in a superscalar processor using a reservation station. The configuration of the register array is shown in FIG. 9.

When an access is made to a source register, if the valid flag VF indicates "invalid", this means that the register value VALUE is not determined. In this case, the identifier uniquely corresponding to the instruction trying to write a value to the register is loaded instead of that value. In the present embodiment, MMA is used as the identifier, as shown in FIG. 9. Then, the firing control unit (FC) 400 waits until the value is forwarded with MMA as a tag. The ID further makes a write reservation to the destination register. That is, first the ID invalidates the VF of the destination register, and then writes the MMA of the current instruction to the destination register.

Figure 8B:
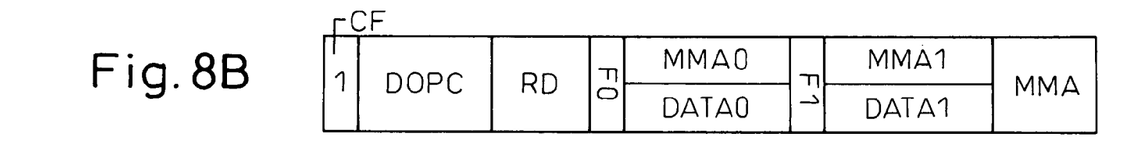

Thus, when the control-driven packet shown in FIG. 8A is input, the instruction decode unit (ID) 200 outputs the control-driven packet shown in FIG. 8B. That is, the output packet carries control-driven flag CF (=1), decoded operation code DOPC, destination register RD, renamed first source register MMA0 or first source operand value DATA0, renamed second source register MMA1 or second source operand value DATA1, and MMA of the current instruction. The output packet also carries a flag F0 that indicates which of the values, the renamed first source register MMA0 or the first source operand value DATA0, is stored, and a flag F1 that indicates which of the values, the renamed second source register MMA1 or the second source operand value DATA1, is stored.

The data-driven packet (FIG. 7B) or the control-driven packet (FIG. 8B) created by the instruction decode unit (ID) 200 is sent to the second packet transfer switch (SW2) 300. Based on the decoded operation code DOPC carried in the input packet, the SW2 transfers the input packet to the firing control unit (FC) 400 corresponding to the execution unit (EX) 500 suited to carry out the instruction.

Figure 10:
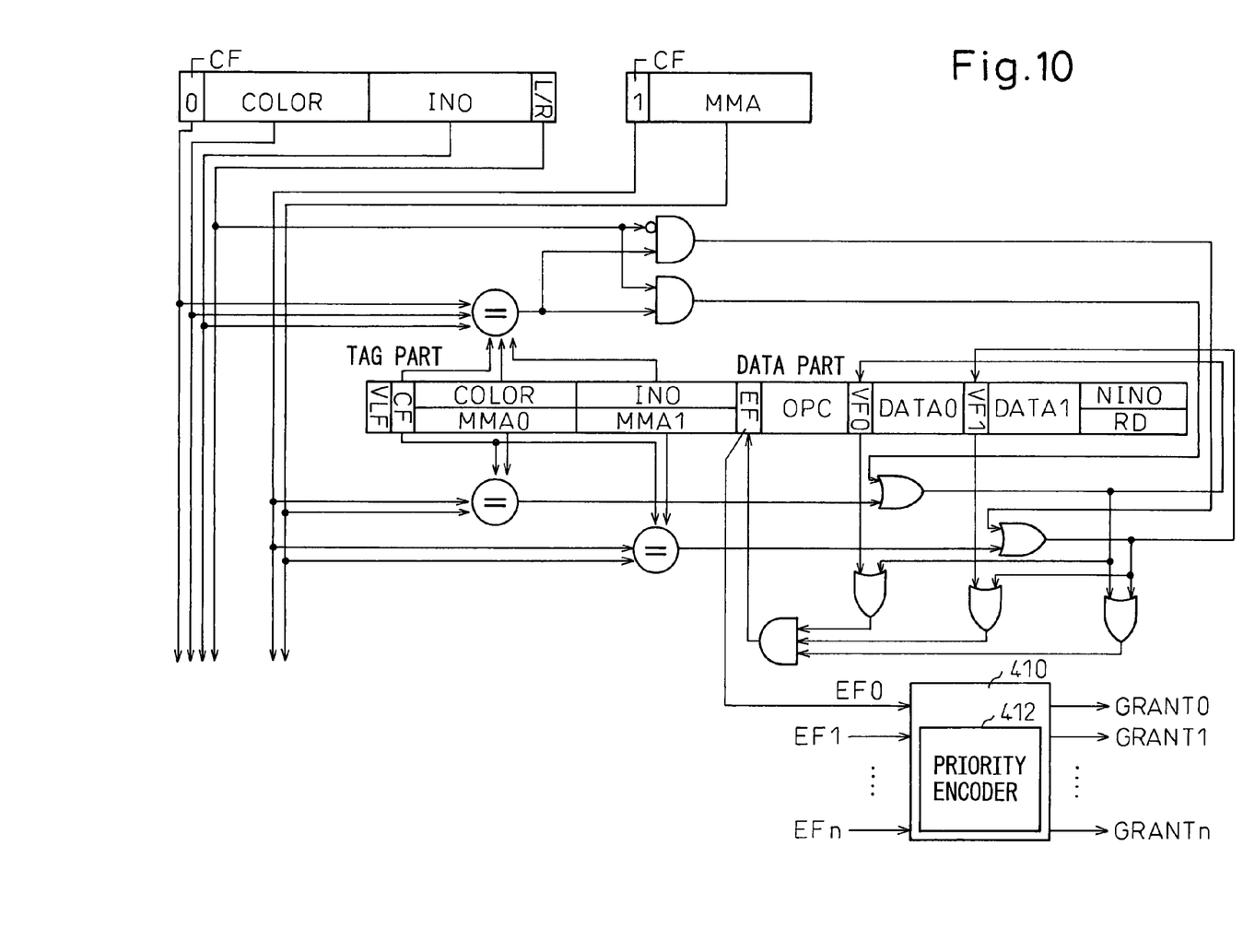
FIG. 10 is a diagram showing the configuration of the firing control unit (FC) 400 along with a matching memory (MM) 480.

Next, the general configuration and basic operation of the firing control unit (FC) 400 will be described. FIG. 10 shows the general configuration of the FC along with its matching memory (MM). The instruction packet sent to the FC is stored in the matching memory where it waits until all of its source operands become available. The matching memory is constructed from a CAM (Content Addressable Memory), and comprises a tag part and a data part.

In the case of a data-driven process, since source operands of each instruction are always sent from the ID in the form of a packet, the number of instructions that can be fired simultaneously is at most one for each input packet. In the prior art data-driven processor, as the packet can be sent to the EX immediately after the firing condition is satisfied, it has only been required that the matching memory be able to store no more than one source operand. On the other hand, in the case of a control-driven process, the source operand not determined at the ID is forwarded from the EX to the FC. At this time, if a plurality of instructions are referencing the same register, the plurality of instructions simultaneously become ready to fire when a single operation result is forwarded. Therefore, in the present embodiment, each matching memory is also used as a buffer for an instruction made ready to fire. That is, each matching memory is configured to be able to store two source operands. A flag (Enable Flag; EF) is also provided that indicates whether the instruction is ready to fire or not.

When the data-driven packet (FIG. 7B) is input, first it is checked whether the matching one is stored in the matching memory. More specifically, the tag part of each entry in the matching memory is searched by using the control-driven flag CF, color COLOR, and instruction number INO in the input packet as the keys, as shown in FIG. 10.

If the matching one does not exist, that is, if an entry whose CF, COLOR, and INO match does not exist, then the input packet is stored at the address pointed to by the MMA secured by the ID, and VLF (Valid Line Flag) of that entry is set valid. Here, the operand value DATA carried in the input packet is stored as DATA0 or DATA1 in that entry in accordance with the port flag L/R carried in the input packet, and VF0 (Valid Flag 0) or VF1 (Valid Flag 1) is set valid. On the other hand, if the matching one exists, that is, if an entry whose CF, COLOR, and INO match exists, VF0 and DATA0 or VF1 and DATA1 in that entry are updated in accordance with the port flag L/R, and EF is set valid.

When the control-driven packet (FIG. 8B) is input, if all the source operands are not available yet, that is, if at least either one of the flags, F0 or F1, in the input packet, is 0, the packet is stored at the address pointed to by the MMA secured by the ID, and VLF (Valid Line Flag) is set valid. Then, the instruction waits until the operation result of an instruction that generates the source operand is forwarded from the execution unit (EX) 500, as will be described below.

When the operation result is forwarded from the EX, the tag part of each entry in the matching memory is searched by using, as the keys, the control-driven flag CF and the MMA of the instruction that generated the operation result. Then, an entry whose CF and MMA0 or MMA1 in the tag part match the thus input CF and MMA is detected. Here, MMA0 is the MMA of the instruction that has made a write reservation to the source register RS0, and MMA1 is the MMA of the instruction that has made a write reservation to the source register RS1. When MMA0 matches, VF0 in the entry is updated, and further, the operand value DATA0 is updated by the forwarded operation result. Likewise, when MMA1 matches, VF1 and DATA1 are updated accordingly. When all the source operands become available, EF is set valid.

When the control-driven packet (FIG. 8B) is input, if all the source operands are available, that is, if the flags F0 and F1 in the input packet are both 0, the input packet is stored at the address (MMA) in the matching memory secured by the ID, and VLF indicating that the instruction at that address is valid is set valid. Further, EF indicating that the instruction is ready to fire is set valid.

The flag EF in each entry is sent as a signal to a selector circuit 410, and one of issue permit signals GRANT0 to GRANTn is set active based on a priority encoder 412 contained therein. In this way, the instruction to which the issue permit is granted is sent to the execution unit (EX) 500 at the next stage.

The data-driven packet output from the firing control unit (FC) 400 carries control-driven flag CF (=0), color COLOR, decoded operation code DOPC, first operand value DATA0, second operand value DATA1, next instruction number NINO, and next port flag NL/R, as shown in FIG. 7C. On the other hand, the control-driven packet output from the firing control unit (FC) 400 carries control-driven flag CF (=1), decoded operation code DOPC, destination register RD, first operand value DATA0, second operand value DATA1, and MMA of the current instruction, as shown in FIG. 8C.

Next, the execution unit (EX) 500 will be described. The EX receives the data-driven packet (FIG. 7C) or the control-driven packet (FIG. 8C) from the firing control unit (FC) 400, and performs the operation specified by the decoded operation code DOPC, by using the first operand value DATA0 and the second operand value DATA1 carried in the packet.

When the input packet is the data-driven packet shown in FIG. 7C, the result of the operation by the EX is sent to the instruction fetch unit (IF) 100 via the first packet transfer switch (SW1) 80 in the form of the data-driven packet shown in FIG. 7D. That is, the packet carries color COLOR, next instruction number NINO, next port flag NL/R, and operation result DATA.

Figure 8C:
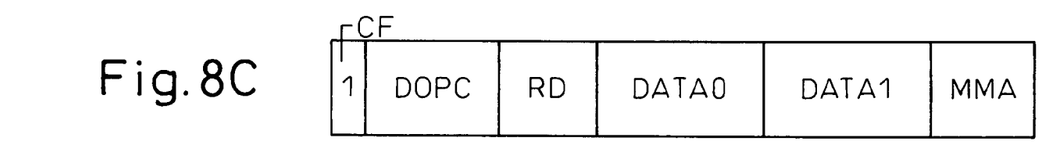
Figure 8D:
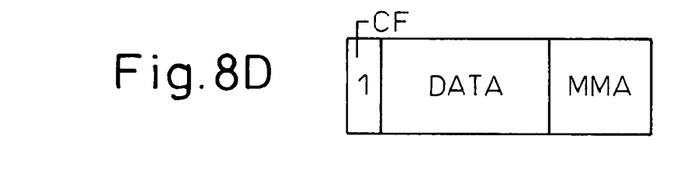
FIG. 8D is a diagram showing the control-driven packet that the execution unit (EX) sends to the firing control unit (FC)

On the other hand, when the input packet is the control-driven packet shown in FIG. 8C, the result of the operation by the EX is forwarded to the firing control unit (FC) 400, and written to the matching memory (MM) 480. The control-driven packet carries control-driven flag CF (=1), operation result DATA, and renamed register MMA, as shown in FIG. 8D. Further, the control-driven packet carrying control-driven flag CF (=1), operation result DATA, and destination register RD, as shown in FIG. 8E, is sent to the write back unit (WB) 600.

Figure 8E:
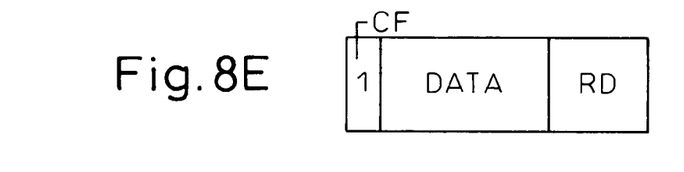
FIG. 8E is a diagram showing the control-driven packet that the execution unit (EX) sends to a write back unit (WB)

When the control-driven packet shown in FIG. 8E is received, the write back unit (WB) 600 accesses the register array (REG) 280, updates the value of the register specified by RD in the packet (the register to which a write reservation has been made by the instruction) by using DATA carried in the packet, and sets the flag VF within that register valid.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A data processor for multiprocessing a data-driven program and a control-driven program in the same pipeline, on an instruction-by-instruction basis, wherein a processing element for performing pipeline processing comprises:

an instruction fetch unit which fetches a data-driven instruction or a control-driven instruction from an instruction memory based on an input packet or a program counter, and issues the instruction in the form of a packet;

an instruction decode unit which decodes the instruction issued from the instruction fetch unit, and outputs the decoded instruction in the form of a packet wherein, in the case of the control-driven instruction, an access is made to a register and, if a data hazard is detected, register renaming is performed, before outputting the decoded instruction;

a firing control unit which stores the instruction decoded by the instruction decode unit in a matching memory for waiting therein, and which selects one of ready-to-fire instructions and outputs the selected instruction in the form of a packet, thereby performing control to fire the instruction;

an execution unit which performs an operation specified by the instruction fired by the firing control unit and, in the case of the data-driven instruction, transfers an operation result in the form of a packet to the instruction fetch unit, but in the case of the control-driven instruction, forwards the operation result in the form of a packet to the firing control unit; and a write back unit which writes the operation result of the control-driven instruction executed by the execution unit into a register associated therewith.

2. A data processor as claimed in claim 1, wherein the data processor includes a plurality of the processing elements, and wherein the packet output by the execution unit is transferred via a first packet transfer switch to the instruction fetch unit in one of the processing elements.

3. A data processor as claimed in claim 1, wherein the data processor includes a plurality of the firing control units and a plurality of the execution units each paired with a corresponding one of the firing control units, and wherein the packet output by the instruction decode unit is transferred via a second packet transfer switch to the firing control unit corresponding to the execution unit suited to execute the instruction.

4. A data processor as claimed in claim 1, wherein when the data-driven instruction and the control-driven instruction can be fetched simultaneously, the instruction fetch unit preferentially fetches the data-driven instruction.

5. A data processor as claimed in claim 4, wherein when the number of data-driven instructions fetched in succession exceeds a preset value, the instruction fetch unit preferentially fetches the control-driven instruction.

6. A data processor as claimed in claim 1, wherein for the instruction input thereto, the instruction decode unit performs processing to secure an area within the matching memory to store the instruction.

7. A data processor as claimed in claim 1, wherein in the case of the control-driven instruction, the instruction decode unit makes a write reservation to a destination register.

8. A data processor as claimed in claim 1, wherein in the case of the control-driven instruction, the firing control unit detects a ready-to-fire state based on color and instruction number carried in the packet input thereto, while in the case of the control-driven instruction, the firing control unit detects a ready-to-fire state by detecting arrival of a source operand value based on a renamed register name carried in the packet forwarded from the execution unit.

* * * * *

UNITED STATES PATENT AND TRADEMARK OFFICE
CERTIFICATE OF CORRECTION

PATENT NO. : 7,127,589 B2 Page 1 of 1
APPLICATION NO. : 10/952913
DATED : October 24, 2006
INVENTOR(S) : Hiroaki Nishikawa et al.

It is certified that error appears in the above-identified patent and that said Letters Patent is hereby corrected as shown below:

Title Page, Item (75) (Inventors), Line 5, change "Ibaraki" to --Tsukuba--.

Signed and Sealed this

Third Day of April, 2007

JON W. DUDAS
*Director of the United States Patent and Trademark Office*